Figures 1, 2, 3:
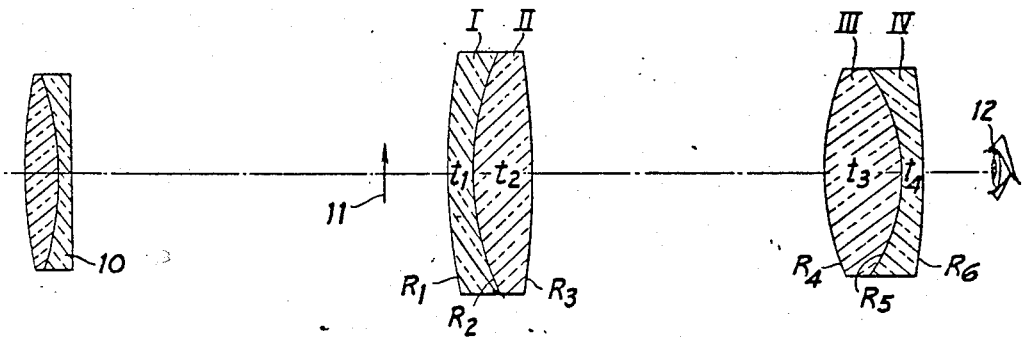

| SEMI FIELD 15° | | F = 65.9 MM | FRONT FOCUS = 11.43 MM. |
|---|---|---|---|
| LENS | $N_D$ | $v$ | RADII | SPACINGS |
| I | 1.649 | 33.8 | $R_1$ = +102.9 MM. | $t_1$ = 4.0 MM. |
| II | 1.517 | 64.5 | $R_2$ = +49.1 " | $t_2$ = 10.0 " |
|  |  |  | $R_3$ = −146.2 " |  |
|  |  |  |  | $S$ = 50.0 " |
| III | 1.573 | 57.4 | $R_4$ = +45.9 | $t_3$ = 13.3 " |
| IV | 1.649 | 33.8 | $R_5$ = −29.8 | $t_4$ = 3.0 " |
|  |  |  | $R_6$ = −169.7 |  |

| F = 100 MM. | |
|---|---|
| RADII | SPACINGS |
| $R_1$ = +156.0 MM. | $t_1$ = 6.1 MM. |
| $R_2$ = +74.5 " | $t_2$ = 15.2 " |
| $R_3$ = −222.0 " | $S$ = 75.8 " |
| $R_4$ = +69.6 " | $t_3$ = 20.2 " |
| $R_5$ = −45.2 " | $t_4$ = 4.6 " |
| $R_6$ = −257.6 " |  |

RUDOLF KINGSLAKE
WILLIAM DONALD ORSER
INVENTORS

BY
ATTY & AG'T

Jan. 29, 1946.   R. KINGSLAKE ET AL   2,393,782
OCULAR
Filed May 1, 1943    2 Sheets-Sheet 2
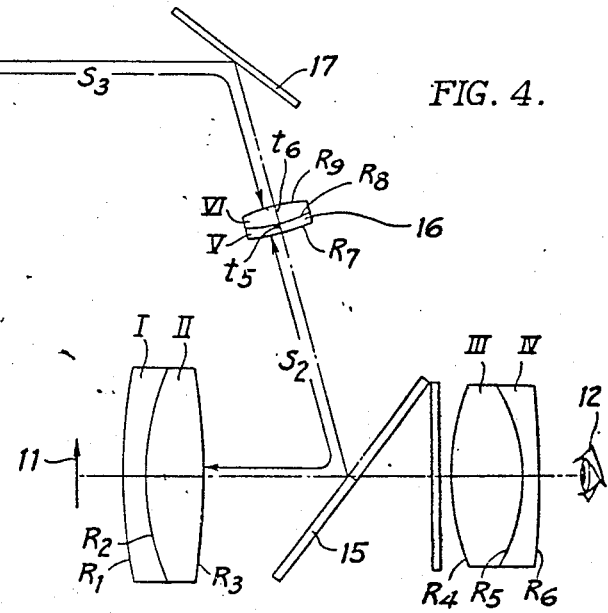
FIG. 4.
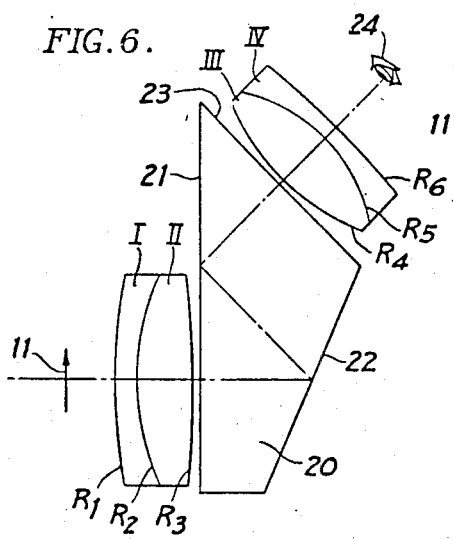
FIG. 5.
| | F = 200.9 MM | | | f/25 |
|---|---|---|---|---|
| LENS | $N_D$ | $V$ | RADII | SPACINGS |
| V | 1.649 | 33.8 | $R_7 = +70.3$ MM. | $S_2 = 160.6$ MM. |
| VI | 1.573 | 57.4 | $R_8 = +26.6$ " | $t_5 = 2.0$ " |
| | | | $R_9 = -109.2$ " | $t_6 = 3.1$ " |
| | | | | $S_3 = 162.5$ " |
FIG. 6.
FIG. 7.
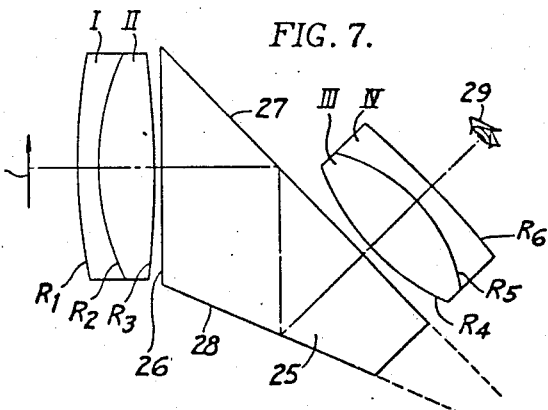
RUDOLF KINGSLAKE
WILLIAM DONALD ORSER
INVENTORS
BY
ATT'Y & AG'T Patented Jan. 29, 1946

2,393,782

UNITED STATES PATENT OFFICE 2,393,782

OCULAR

Rudolf Kingslake and William Donald Orser, Rochester, N. Y., assignors to Eastman Kodak Company, Rochester, N. Y., a corporation of New Jersey Application May 1, 1943, Serial No. 485,312

6 Claims. (Cl. 88—57)

This invention relates to oculars, particularly for use in instruments incorporating a terrestrial telescope or other image forming arrangement.

It is the object of the invention to provide a highly corrected ocular covering a semi-field of about 15° and having a large central airspace to permit oblique reflectors to be placed therein. It is an object of a preferred embodiment of the invention to have such a reflector either in the form of a semi-transparent mirror or in the form of a double reflecting prism for altering the direction of the optic axis of the system.

The latter embodiment of the invention has the entrance and exit faces of the prism orthogonal to the optic axes of the front and rear components respectively of the ocular. The reflecting faces of the prism, one of which may be either the entrance or the exit face, are at an angle equal to ½ of that between the optic axes of the components, the latter angle being that through which the optic axis of the system is deviated for comfortable viewing.

Another embodiment of the invention has a semi-transparent surface between the components to act as a beam splitter sending one beam to the rear component and sending the other beam, preferably the reflected one, to a camera which has a lens of proper focal length to focus this other beam in its film plane.

The preferred form of the invention is illustrated in the accompanying drawings, in which:

Fig. 1 shows an ocular according to the invention in its simplest form;

Fig. 2 gives the optical characteristics of the ocular shown in Fig. 1;

Fig. 3 gives these characteristics for a similar ocular of 100 mm. focal length;

Fig. 4 shows a preferred embodiment of the invention coupled to a photographic camera;

Fig. 5 gives the optical characteristics for the focusing part of the system shown in Fig. 4;

Figs. 6 and 7 show two embodiments of the invention in which the optic axis of the rear component is tilted at 45° to that of the front component for ease in viewing.

In Fig. 1 a telescope objective 10 forms an image 11 which is viewed through the eyepiece according to the invention, by an eye 12 of the observer. The characteristics of this eyepiece are given in Fig. 2 and are as follows:

Semi-field 15°, F=65.9 mm., front focus=11.43 mm.

| Lens | $N_D$ | V | Radii | Spacings |
|---|---|---|---|---|
| I | 1.649 | 33.8 | $R_1=+102.9$ mm. | $t_1=4.0$ mm. |
| II | 1.517 | 64.5 | $R_2=+49.1$ mm. | $t_2=10.0$ mm. |
| | | | $R_3=-146.2$ mm. | $S=50.0$ mm. |
| III | 1.573 | 57.4 | $R_4=+45.9$ mm. | $t_3=13.3$ mm. |
| IV | 1.649 | 33.8 | $R_5=-29.8$ mm. | $t_4=3.0$ mm. |
| | | | $R_6=-160.7$ mm. | |

The above table gives the actual characteristics of the eyepiece required to cooperate with a camera or to have the double reflecting prism, but for comparison with other eyepieces, the radii and spacings are converted in Fig. 3 and in the following table to a focal length of 100 mm.

| F=100 mm. | |
|---|---|
| Radii | Spacing |
| $R_1=+156.0$ mm. | $t_1=6.1$ mm. |
| $R_2=+74.5$ mm. | $t_2=15.2$ mm. |
| $R_3=-222.0$ mm. | $S=75.8$ mm. |
| $R_4=+69.6$ mm. | $t_3=20.2$ mm. |
| $R_5=-45.2$ mm. | $t_4=4.5$ mm. |
| $R_6=-257.6$ mm. | |

In both of the above tables the + and − signs refer to the radii of curvature of surfaces which are respectively convex and concave to the incident light.

In Fig. 4 a beam splitter in the form of a semi-transparent mirror 15 which has a non-reflecting coating on one surface thereof to prevent double reflection, is positioned as a beam splitter between the two components. One of the beams, in this case the transmitted one, is directed to the rear component of the ocular. The other beam is directed to a positive lens 16 and a mirror 17 which bring the beam to focus on the film plane 18 of a camera 19 shown schematically. The front component made up of elements I and II cooperates with the lens 16 as the objective of the camera to focus on the image 11. Fig. 5 gives the following table which shows the characteristics of the lens 16.

F=200.9 mm.    f/25

| Lens | $N_D$ | V | Radii | Spacings |
|---|---|---|---|---|
| V | 1.649 | 33.8 | $R_1=+70.3$ mm. | $S_2=160.6$ mm. |
| | | | $R_2=+26.6$ mm. | $t_5=2.0$ mm. |
| VI | 1.573 | 57.4 | $R_3=-109.2$ mm. | $t_6=3.1$ mm. |
| | | | | $S_3=162.5$ mm. |

In Fig. 6 light from the image 11 through the front component enters a double reflecting prism 20 through an entrance face 21 orthogonal to the optic axis of the front component. This light is then reflected at the two reflecting surfaces 22 and 21 and passes through the exit face 23 to the rear component and thence to the eye 24 of an observer comfortable positioned. If the distance from the element II to the face 21 is 1.4 mm. and the distance from the face 23 to the element III is 1.3 mm. the path in the prism 20 must be such that its air equivalent is 47.3 mm. For example, using glass of index 1.517, the total path in glass should be 71.7 mm.

In Fig. 7 a similar arrangement is shown using a double reflecting prism 25 tipped the other way so that its entrance face is 26, its reflecting faces are 27 and 28 and its exit face is one of the reflecting faces, namely, 27. The eye 29 of the observer is looking downward at 45° to the optic axis of the front component as before, but is somewhat lower than in Fig. 6. It will be noted in both of these figures that the reflecting faces 21 and 22 in Fig. 6, 27 and 28 in Fig. 7, are at an angle of 22½°, which is ½ the angle between the optic axes of the front and rear components of the ocular.

Having thus described various embodiments of our invention, we wish to point out that it is not limited to these structures but is of the scope of the appended claims.

What we claim and desire to secure by Letters Patent of the United States is:

1. An ocular comprising two spaced components with approximately the following characteristics

| Elements | $N_D$ | V | Radii | Spacings |
|---|---|---|---|---|
| I | 1.65 | 34 | $R_1 = +1.5F$ | $t_1 = .06F$ |
| II | 1.52 | 65 | $R_2 = +.75F$ | $t_2 = .15F$ |
|  |  |  | $R_3 = -2.2F$ | $S = .75F$ |
| III | 1.57 | 57 | $R_4 = +.7F$ | $t_3 = .2F$ |
| IV | 1.65 | 34 | $R_5 = -.5F$ | $t_4 = .05F$ |
|  |  |  | $R_6 = -2.5F$ |  | where the first colum numbers the elements from front to rear, $N_D$ is the index of refraction for the D spectrum line, V is the dispersive index, F is the focal length, $R_1$ to $R_6$ are the surface radii from front to rear, + and − indicating respectively those convex and concave to the incident light, $t_1$ to $t_4$ are the thicknesses and S is the axial optical spacing between the components.

2. An ocular according to claim 1 including a reflector oblique to the optic axis between the components.

3. An ocular according to claim 1 including a semi-transparent reflector oblique to the optic axis between the components and transmitting said axis substantially undeviated.

4. An ocular according to claim 1 including between the components a double reflector, reflecting the optic axis twice.

5. An ocular according to claim 1 including between the components a double reflecting prism with its entrance and exit faces respectively orthogonal to the optic axes of the front and rear components and its reflecting faces at an angle to each other equal to one half the angle between said optic axes.

6. An ocular according to claim 1 including a beam splitter between the components to receive light from the front component and to form two beams, the rear component being positioned to receive and collimate one of the beams, and a camera with a positive lens positioned to receive the other beam and focus it on the film plane of the camera.

RUDOLF KINGSLAKE.
WILLIAM DONALD ORSER.